United States Patent
Kostar et al.

(10) Patent No.: US 6,932,682 B2
(45) Date of Patent: Aug. 23, 2005

(54) METHOD AND APPARATUS FOR ULTRASONIC MACHINING

(75) Inventors: Timothy D. Kostar, Cincinnati, OH (US); Thomas W. Rentz, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 10/273,162

(22) Filed: Oct. 17, 2002

(65) Prior Publication Data

US 2004/0077293 A1 Apr. 22, 2004

(51) Int. Cl.[7] .................................................. B24B 7/00
(52) U.S. Cl. .................................. 451/165; 451/65
(58) Field of Search .......................... 451/165, 65, 69, 451/36, 38–40, 555, 558

(56) References Cited

U.S. PATENT DOCUMENTS

| | | | |
|---|---|---|---|
| 4,731,957 A | * | 3/1988 | Weisinger .................. 451/558 |
| 5,549,002 A | | 8/1996 | Howard et al. |
| 5,631,424 A | | 5/1997 | Nieters et al. |
| 5,700,189 A | * | 12/1997 | Farris ......................... 451/555 |
| 5,760,904 A | | 6/1998 | Lorraine et al. |
| 5,915,277 A | | 6/1999 | Patton |
| 5,974,886 A | | 11/1999 | Carroll et al. |
| 6,099,471 A | | 8/2000 | Torp et al. |
| 6,137,853 A | | 10/2000 | Duckering et al. |
| 6,142,019 A | | 11/2000 | Venchiarutti et al. |
| 6,182,512 B1 | | 2/2001 | Lorraine |

* cited by examiner

*Primary Examiner*—Hadi Shakeri
(74) *Attorney, Agent, or Firm*—William Scott Andes; Armstrong Teasdale LLP

(57) ABSTRACT

A method for machining a component. The method includes providing a machining apparatus configured to induce vibrations such that a vibration direction of the machining apparatus is substantially aligned with respect to a machining direction of the component, and vibrating the machining apparatus in the vibration direction to machine the component in the machining direction.

9 Claims, 5 Drawing Sheets

METHOD AND APPARATUS FOR ULTRASONIC MACHINING

BACKGROUND OF THE INVENTION

This invention relates generally to machining techniques, and more specifically to methods and apparatus for ultrasonic machining.

At least some known components include features that require ultrasonic machining. More specifically, complex-shaped components, for example gas turbine engine blades, often have geometric constraints which may limit the use of conventional machining methods. For example, blind holes which have non-circular and/or tapered cross-sections may be inaccessible to conventional machining heads. Typically, ultrasonic machining is a "directional" machining process, wherein to optimize performance an amplitude of a sonic vibration is aligned with a direction of desired material removal. However, aligning the sonic vibration amplitude may limit the usefulness of ultrasonic machining when applied to complex-shaped components.

At least some known ultrasonic machining methods use trial and error to machine complex-shaped components. More specifically, in at least some known ultrasonic machining methods, various curved or irregularly-shaped tuning forks or cutters are fabricated, and an amplitude of vibration is bent or redirected into alignment with geometry of the tuning fork or cutter. However, bending or redirecting an amplitude into alignment with the geometry of the tuning fork or cutter may inhibit the amount of energy directed to a machining surface or material, and thus may limit the effectiveness of the ultrasonic machining.

BRIEF DESCRIPTION OF THE INVENTION

In one aspect, a method is provided for machining a component. The method includes providing a machining apparatus configured to induce vibrations such that a vibration direction of the machining apparatus is substantially aligned with respect to a machining direction of the component, and vibrating the machining apparatus in the vibration direction to machine the component in the machining direction.

A machining tool is provided for machining a component. The tool includes a body including a first projection extending therefrom and a second projection extending therefrom. The first projection is spaced a distance across the body from the second projection. The body is configured to vibrate in a direction substantially aligned with a machining direction of the component. The tool further includes a cross-bar removably coupled to the body between the first and second projections. The cross-bar includes at least one machining surface. The cross-bar and the machining surface are configured to vibrate with the body in a direction substantially aligned with respect to the machining direction of the component such that the machining surface machines the component in the machining direction.

A machining tool assembly is provided for machining a gas turbine engine blade. The assembly includes a base, a fixture coupled to the base and configured to couple to the component such that the component is fixedly secured in position during machining of the component, an ultrasonic vibration unit coupled to the base, and a machining tool coupled to the ultrasonic vibration unit. The machining tool is configured to vibrate in a direction substantially aligned with respect to a machining direction of the component to machine the component in the machining direction. The ultrasonic vibration unit is configured to control vibration of the machining tool.

DETAILED DESCRIPTION OF THE INVENTION

As used herein the terms "machining", "machine", and "machined" may include any process used for shaping a component. For example, processes used for shaping a component may include turning, planing, milling, grinding, finishing, polishing, and/or cutting. In addition, and for example, shaping processes may include processes performed by a machine, a machine tool, and/or a human being. The above examples are intended as exemplary only, and thus are not intended to limit in any way the definition and/or meaning of the terms "machining", "machine", and "machined". In addition, as used herein the term "component" may include any object that has been or may be machined. Furthermore, although the invention is described herein in association with a gas turbine engine, and more specifically for use with an engine blade for a gas turbine engine, it should be understood that the present invention may be applicable to any component and/or any machining process. Accordingly, practice of the present invention is not limited to the machining of engine blades or other components of gas turbine engines. In addition, as used herein the term "machining apparatus" may include any device used to machine a component.

Figure 1:
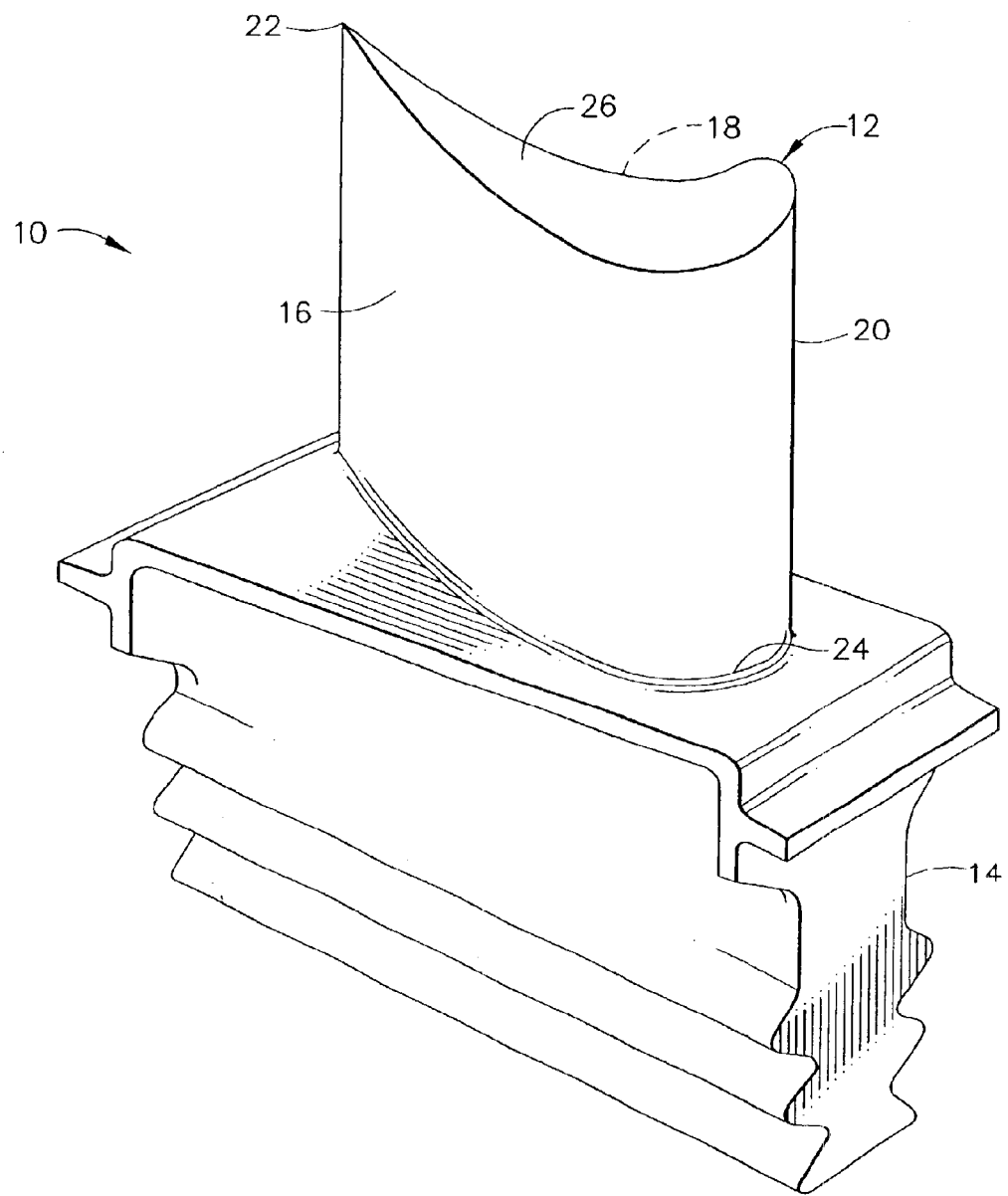
FIG. 1 is a perspective view of an exemplary gas turbine engine blade.

FIG. 1 is a perspective view of an engine blade 10 that may be used with a gas turbine engine (not shown). In one embodiment, a plurality of turbine blades 10 form a high-pressure turbine rotor blade stage (not shown) of the gas turbine engine. Each blade 10 includes a hollow airfoil 12 and an integral dovetail 14 that is used for mounting airfoil 12 to a rotor disk (not shown) in a known manner. Alternatively, blades 10 may extend radially outwardly from a disk (not shown), such that a plurality of blades 10 form a blisk (not shown). Each airfoil 12 includes a first contoured sidewall 16 and a second contoured sidewall 18. First sidewall 16 is convex and defines a suction side of airfoil 12, and second sidewall 18 is concave and defines a pressure side of airfoil 12. Sidewalls 16 and 18 are joined at a leading edge 20 and at an axially-spaced trailing edge 22 of airfoil 12. More specifically, airfoil trailing edge 22 is spaced chordwise and downstream from airfoil leading edge 20. First and second sidewalls 16 and 18, respectively, extend longitudinally or radially outward in span from a blade root 24 positioned adjacent dovetail 14, to an airfoil tip 26.

Figure 2:
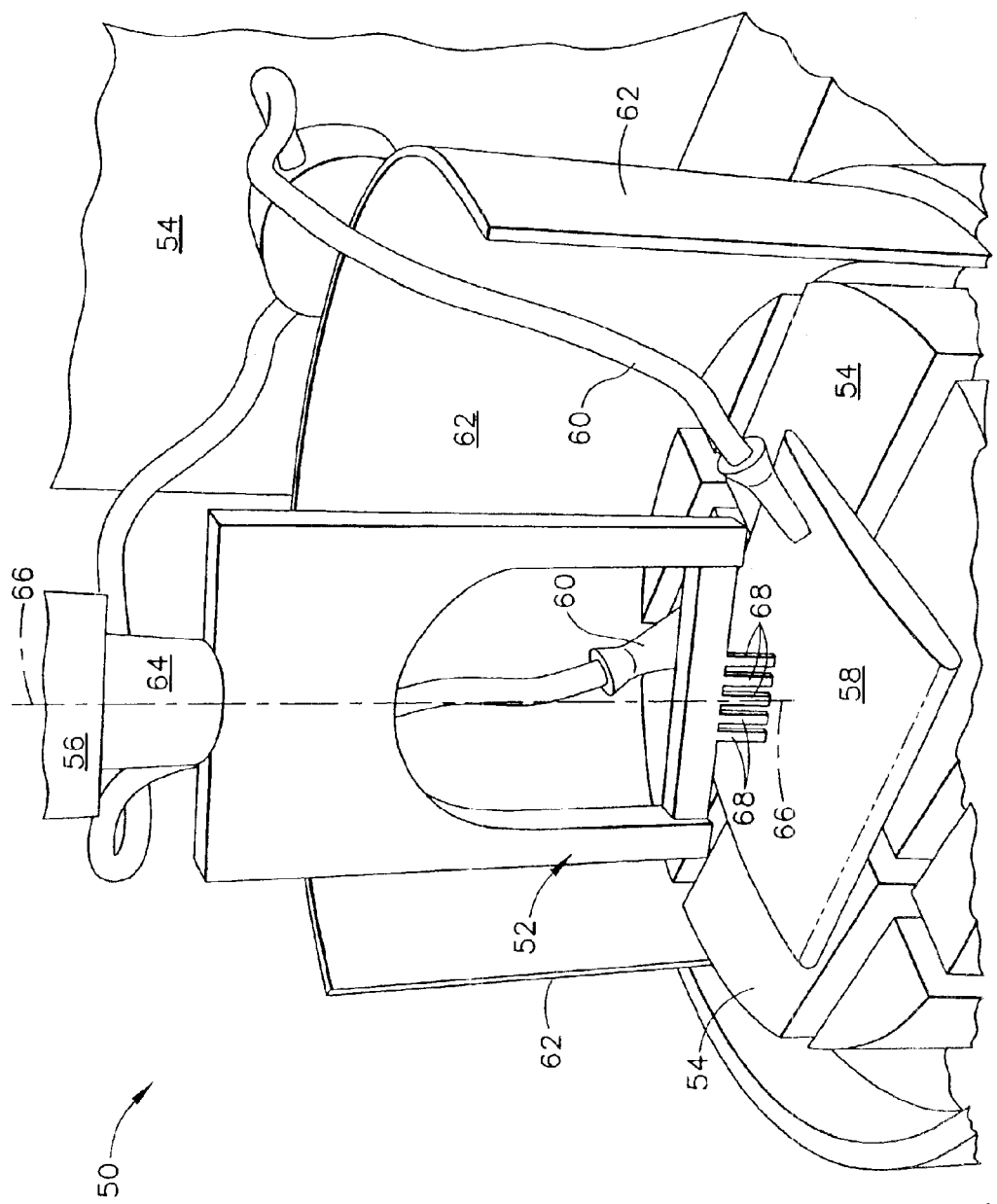
FIG. 2 is a perspective view of an exemplary machining tool assembly for machining a component, such as the gas turbine engine blade shown in FIG. 1.
Figure 3:
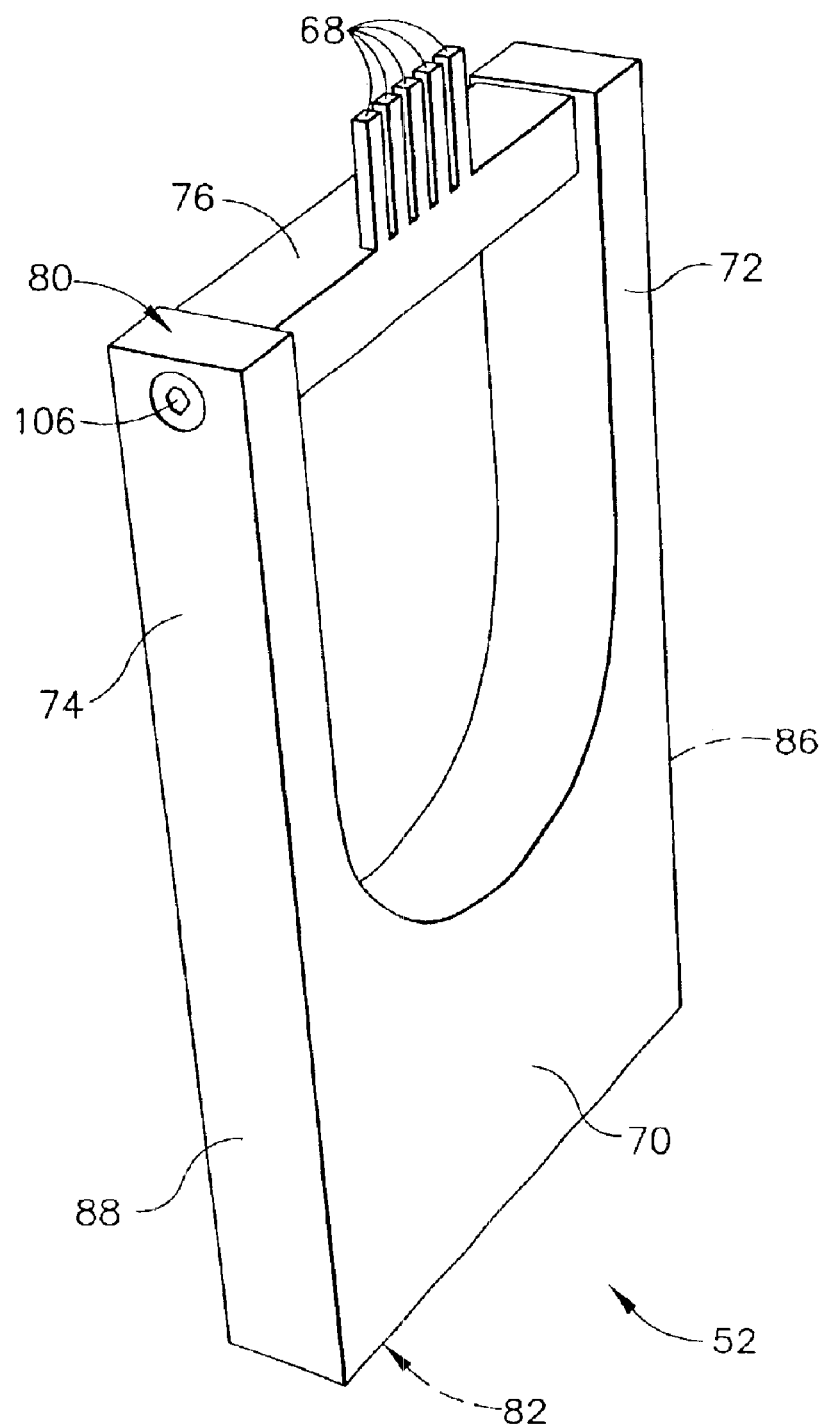
FIG. 3 is a perspective view of an exemplary machining tool that may be included in the machining tool assembly shown in FIG. 2.

FIG. 2 is a perspective view of a machining tool assembly 50 used for machining blade 10 (shown in FIG. 1). FIG. 3 is a perspective view of a machining tool 52 included within machining tool assembly 52. Tool assembly 50 includes machining tool 52, a base 54, an ultrasonic vibration unit 56, a fixture 58, at least one abrasive particle guide 60, and a shield 62. Fixture 58 is coupled to base 54 and is configured to fixedly secure blade 10 during machining. Fixture 58 is coupled to base 54 using any suitable means, such as, but not limited to, threaded bolts (not shown) and threaded openings (not shown). Furthermore, fixture 58 fixedly secures blade 10 during machining using any suitable means. For example, in one embodiment, fixture 58 includes a plurality of clamps (not shown) that fixedly secure blade 10 with respect to fixture 58. Ultrasonic vibration unit (UVU) 56 is coupled to base 54 and includes a vibration head 64. Ultrasonic vibration unit 56 is coupled to base 54 using any suitable means, such as, but not limited to, threaded bolts (not shown) and threaded openings (not shown). Vibration head 64 is coupled to UVU 56 such that vibration head 64 can oscillate, or vibrate, along an axis 66 at varying frequencies and amplitudes.

Machining tool 52 is removably coupled to vibration head 64 and extends outwardly from vibration head 64 along axis 66. Machining tool 52 is removably coupled to vibration head 64 using any suitable means, such as, but not limited to, threaded bolts (not shown) and threaded openings (not shown). Machining tool 52 is configured to vibrate with vibration head 64 along axis 66 and includes at least one cutter 68 that extends outwardly from a portion of machining tool 52. In one embodiment, machining tool 52 includes a plurality of machining surfaces 68 for machining blade 10.

Machining surfaces 68 are referred to herein as cutters 68. Cutters 68 are configured to vibrate with machining tool 52 and vibration head 64 along axis 66. Abrasive particle guide 60 is coupled to base 54 and is in fluid communication with a supply of abrasive particles (not shown). In the exemplary embodiment tool assembly 50 includes a plurality of abrasive particle guides 60. Abrasive particle guide 60 supplies abrasive particles to cutters 68 during machining of blade 10. In one embodiment, abrasive particles are delivered from the supply through abrasive particle guide 60 using a pump (not shown). Furthermore, in one embodiment, abrasive particles include at least one of aluminum oxide, boron carbide, diamond chip, and silicone carbide grains. In addition, and in one embodiment, the abrasive particles are contained in a 50% water slurry.

UVU 56 is configured to direct vibration of vibration head 64 and machining tool 52 along axis 66, and to control the amplitude and frequency of vibration of vibration head 64 and machining tool 52, as desired for machining blade 10. Ultrasonic vibration units 56 used to vibrate a machining tool for machining components are known in the art. During machining, when UVU 56 vibrates vibration head 64, machining tool 52, including cutters 68, vibrates along axis 66. Abrasive particles are supplied by abrasive particle guide 60 between cutters 68 and a surface (not shown) of blade 10 being machined. Vibration of cutters 68 excites the abrasive particles causing the abrasive particles to remove material from blade 10. Shield 62 is coupled to base 54 and is configured to facilitate containing material removed from blade 10 and the abrasive particles within at least a portion of tool assembly 50. Shield 62 is coupled to base 54 using any suitable means, such as, but not limited to, threaded bolts (not shown) and threaded openings (not shown).

Figure 4:
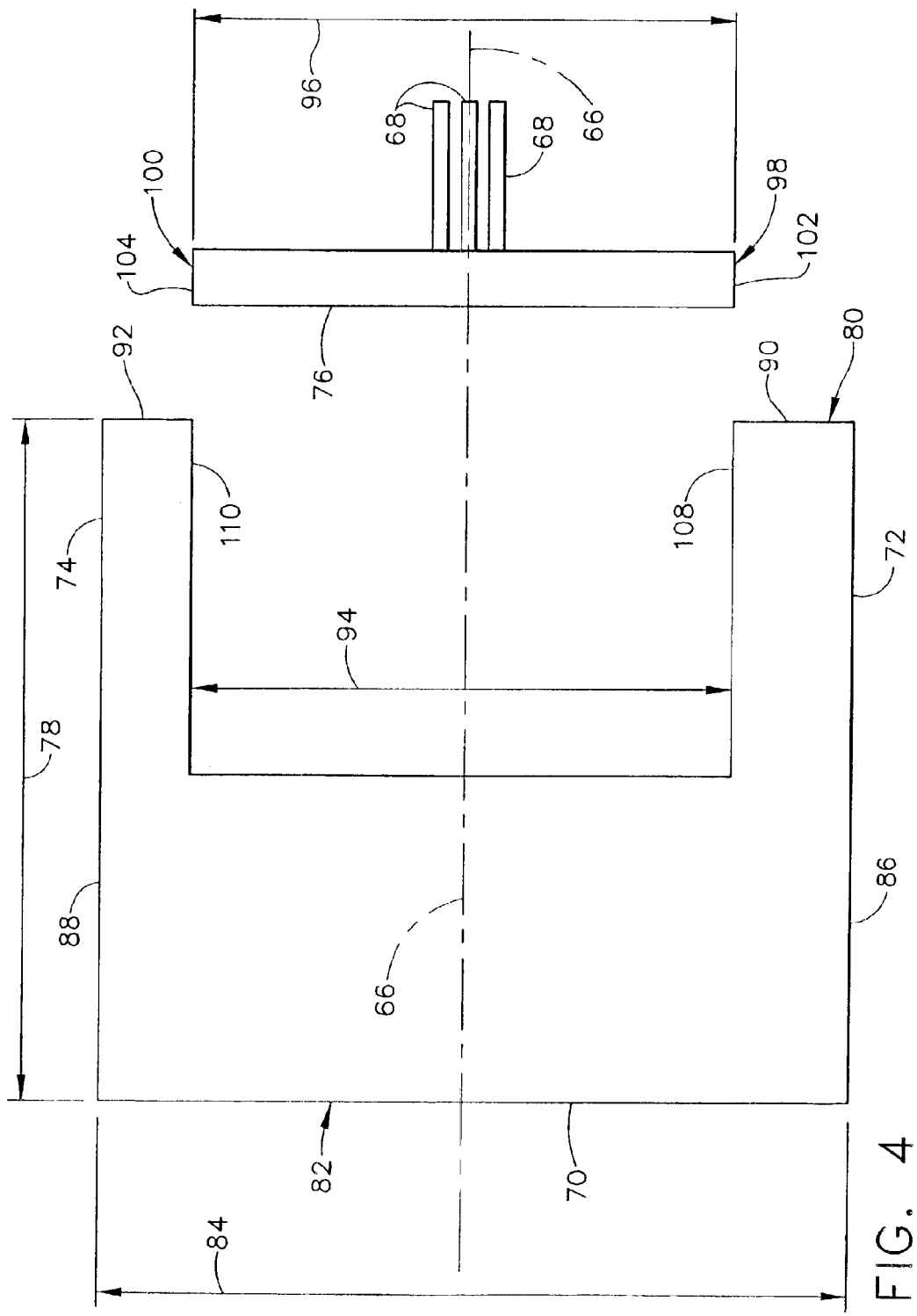
FIG. 4 is a front view of the machining tool shown in FIG. 3 illustrating the machining tool before assembly.
Figure 5:
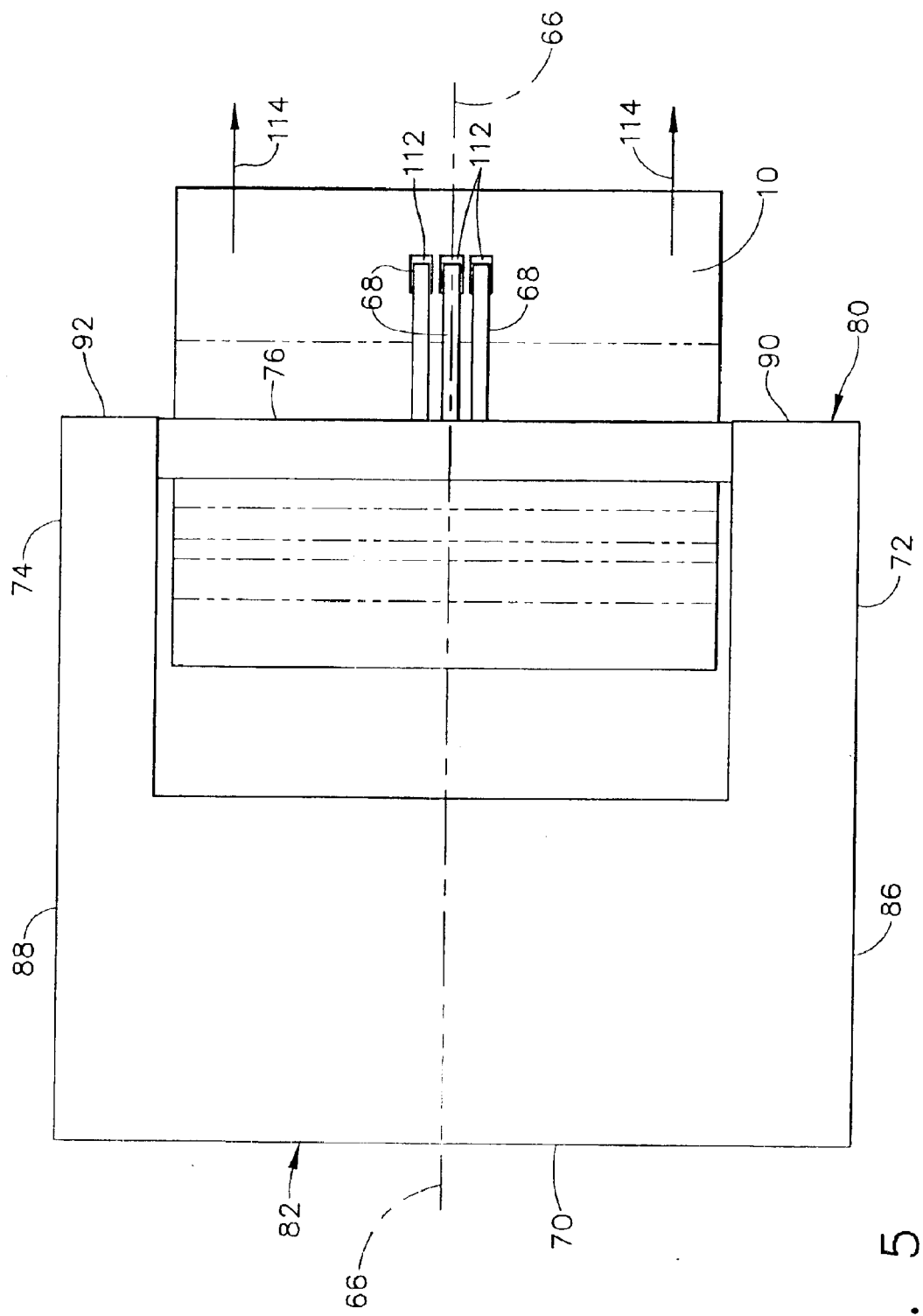
FIG. 5 is a front view of the machining tool shown in FIG. 3 illustrating the machining tool after assembly.

FIG. 4 is a front view of machining tool 52 before assembly, and FIG. 5 is a front view of machining tool 52 after assembly. More specifically, in the exemplary embodiment and before machining blade 10, a portion of machining tool 52 is assembled about a portion of blade 10, such that a portion of blade 10 is received within a portion of machining tool 52. Machining tool 52 includes a body 70, having a first projection 72 and a second projection 74, and a cross-bar 76. Tool body 70 extends a length 78 measured between a first end 80 and a second end 82. Tool body 70 also extends a length 84 measured between a first side 86 and a second side 88.

First projection 72 is adjacent tool body first side 86 and extends outwardly from a portion of tool body 70 to a first projection end 90. Second projection 74 is adjacent tool body second side 88 and extends outwardly from a portion of tool body 70 to a second projection end 92. First projection 72 and second projection 74 are spaced apart along tool body length 84 by a gap 94. In the exemplary embodiment, gap 94 receives at least a portion of blade 10 therein. The geometry of tool body 70 facilitates distributing vibrational energy substantially evenly across tool body 70. For example, in the exemplary embodiment tool body 70 is symmetrical about axis 66 to facilitate evenly distributing vibrational energy. Furthermore, the material and/or geometry of tool body 70 may facilitate efficient and optimal transmittal of vibrational energy. For example, in one embodiment tool body 70 is symmetrical about axis 66 to facilitate efficient and optimal transmittal of vibrational energy. Furthermore, in another embodiment tool body 70 is constructed from a material having a high material modulus, for example high carbon steel, stainless steel, a nickel-based alloy, a carbon-epoxy composite, and graphite, to facilitate efficient and optimal transmittal of vibrational energy. Accordingly, the material properties and/or geometry of tool body 70 may be selected to optimize a desired vibratory response.

Cross-bar 76 extends a length 96 measured between a first end 98 and a second end 100. Cross-bar length 96 is slightly smaller than projection gap 94 such that cross-bar 76 is received within projection gap 94. Cross-bar first end 98 includes a mating surface 102, and cross-bar second end 100 includes a mating surface 104. Cross-bar 76 is removably coupled to tool body 70 between first projection 72 and second projection 74. Cross-bar 76 may be coupled to tool body 70 using any suitable means. For example, in the exemplary embodiment cross-bar 76 is coupled to tool body 70 using threaded bolts 106 and threaded openings (not shown) in cross-bar 76. When cross-bar 76 is coupled to tool body 70, mating surfaces 102 and 104 contact a first projection mating surface 108 and a second projection mating surface 110, respectively. In one embodiment, mating surfaces 102, 104, 108, and 110 are serrated to facilitate efficient and optimal transmission of vibrational energy. In addition, in another embodiment, mating surfaces 102 and 108 are coupled together using an adhesive, and mating surfaces 104 and 110 are coupled together, using an adhesive, to facilitate efficient and optimal transmission of vibrational energy. For example, in one embodiment, mating surfaces 102 and 108 are coupled together with epoxy.

In one embodiment, at least a portion of cross-bar 76 includes a cross-sectional geometry that facilitates distributing vibrational energy substantially evenly across cross-bar 76, and also efficient and optimal transmittal of vibrational energy. For example, in one embodiment cross-bar 76 includes a generally square cross-section. However, it should be understood that the cross-sectional geometry of cross-bar 76 may be any shape producing a desired vibration response, such as, for example, a rectilinear, I-beam, Pi-beam, or T-beam cross-sectional shape. Furthermore, in one embodiment, cross-bar 76 and cutters 68 are at least partially hollow and abrasive particles are delivered through cross-bar 76 to cutters 68. In addition, in one embodiment at least a portion of cross-bar 76 includes a structural stiffness facilitating even distribution of vibrational energy, and efficient and optimal transmittal of vibrational energy. Furthermore, in one embodiment at least a portion of cross-bar 76 includes a material stiffness facilitating even distribution of vibrational energy, and efficient and optimal transmittal of vibrational energy. For example, in one embodiment cross-bar 76 is constructed from a material having a high material modulus, for example carbon steel, to facilitate efficient and optimal transmittal of vibrational energy.

Cross-bar 76 includes at least one cutter 68 that extends outwardly therefrom. In the exemplary embodiment, cross-bar 76 includes a plurality of cutters 68 that are integrally formed with cross-bar 76. Integrally forming cutters 68 with cross-bar 76 facilitates reducing vibratory fatigue loading thereby facilitating a longer operational life for cutters 68. In an alternative embodiment, cutters 68 are formed independently from cross-bar 76 and are coupled to cross-bar 76 using any suitable means. Cutters 68 may be configured in any suitable size and shape based on with the geometry of blade 10 that is to be machined. For example, in the exemplary embodiment blade 10 includes a plurality of openings 112 to be machined by machining tool 52, and cutters 68 are shaped to ultrasonically machine openings 112. In the exemplary embodiment, cutters 68 include a generally square cross-sectional shape. Furthermore, openings 112 may be an size and shape desired to be machined by machining tool 52. For example, openings 112 may have, but are not limited to, a generally constant circular cross-sectional shape, a generally elliptical cross-sectional shape, a slot/race track cross-sectional shape, or a combination of the above or other cross-sectional shapes. In addition, in one embodiment, cross-bar 76 and cutters 68 are at least partially hollow and abrasive particles are delivered through cross-bar 76 to cutters 68 and ultimately to a surface being machined by cutters 68, for example openings 112.

Before machining blade openings 112, machining tool 52 is disassembled such that cross-bar 76 is not coupled to tool body 70 and gap 94 is open between first projection 72 and second projection 74. When blade 10 is fixedly secured to fixture 58 and in position for machining, tool assembly 50 positions machining tool 52 adjacent blade 10 such that a portion of blade 10 is received within gap 94 between first projection 72 and second projection 74. Machining tool 52 is then re-assembled such that cross-bar 76 is fixedly coupled to tool body 70 and a portion of blade 10 is received within gap 94. Machining tool assembly 50 then aligns axis 66 parallel with a machining direction 114 of openings 112, and aligns cutters 68 with openings 112. UVU 56 then vibrates vibration head 64 along axis 66, and the vibration of head 64 is transmitted through machining tool body 70 and cross-bar 76 to cutters 68 for machining openings 112. By aligning axis 66 parallel with machining direction 114, tool assembly 50 aligns the vibration direction of head 64, tool body 70, cross-bar 76, and cutters 68 with cutting direction 114, thereby to facilitate transmitting a sufficient amount of vibrational energy to cutters 68 for machining openings 112.

The above-described tool is cost-effective and highly reliable for machining a component. The tool permits complex geometry to be machined ultrasonically within a gas turbine engine blade. More specifically, the tool aligns a direction of vibration of the machining tool with a cutting direction to facilitate directing sufficient vibrational energy to a blade machining surface. As a result, the tool facilitates reducing machining costs in a cost-effective and reliable manner.

Exemplary embodiments of tool assemblies are described above in detail. The systems are not limited to the specific embodiments described herein, but rather, components of each assembly may be utilized independently and separately from other components described herein. Each tool assembly component can also be used in combination with other tool assembly components.

While the invention has been described in terms of various specific embodiments, those skilled in the art will recognize that the invention can be practiced with modification within the spirit and scope of the claims.

What is claimed is:

1. A machining tool for machining a component, said tool comprising:

a body comprising a first projection extending therefrom and a second projection extending therefrom, said first projection spaced a distance across said body from said second projection, said body configured to vibrate in a direction substantially aligned with a machining direction of the component;

a cross-bar removably coupled to said body between said first and second projections, said cross-bar having at least one machining surface, said cross-bar and said machining surface configured to vibrate with said body in a direction substantially aligned with respect to the machining direction of the component such that said machining surface machines the component in the machining direction, and an ultrasonic vibration unit coupled to said tool for vibrating said body, said cross bar, and said at least one machining surface in a direction substantially aligned with the machining direction.

2. A machining tool in accordance with claim 1 further comprising an axis of symmetry extending through a length of said tool body.

3. A machining tool in accordance with claim 1 wherein said body comprises at least one of high carbon steel, stainless steel, a nickel-based alloy, a carbon-epoxy composite, and graphite.

4. A machining tool in accordance with claim 1 wherein the component is a gas turbine engine blade, said first and second projections configured to receive at least a portion of the gas turbine engine blade therebetween during machining of the gas turbine engine blade.

5. A machining tool in accordance with claim 1 wherein said cross-bar comprises at least one of a hollow cross-section, a square cross-sectional shape, a rectilinear cross-sectional shape, an I-beam cross-sectional shape, a Pi-beam cross-sectional shape, a T-beam cross-sectional shape.

6. A machining tool in accordance with claim 1 wherein said cross-bar comprises at least one of high carbon steel, stainless steel, a nickel-based alloy, a carbon-epoxy composite, and graphite.

7. A machining tool in accordance with claim 1 wherein said cross-bar coupled to said body using adhesive.

8. A machining tool in accordance with claim 1 wherein said body configured to vibrate in a direction substantially aligned with respect to a machining direction of the component, said cross-bar configured to vibrate in a direction substantially aligned with respect to the machining direction, and said machining surface configured to vibrate in a direction substantially aligned with respect to the machining direction.

9. A machining tool in accordance with claim 1 wherein the component is a gas turbine engine blade, said machining surface extending outwardly from said cross-bar and configured to machine at least one opening in the gas turbine engine blade.

* * * * *